(12) United States Patent
Hunt et al.

(10) Patent No.: US 11,544,903 B2
(45) Date of Patent: Jan. 3, 2023

(54) REDUCING VOLUMETRIC DATA WHILE RETAINING VISUAL FIDELITY

(71) Applicants: Sony Group Corporation, Tokyo (JP); Sony Pictures Entertainment Inc., Culver City, CA (US)

(72) Inventors: Brad Hunt, Los Angeles, CA (US); Tobias Anderberg, Los Angeles, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 92 days.

(21) Appl. No.: 16/874,859

(22) Filed: May 15, 2020

(65) Prior Publication Data
US 2021/0183144 A1     Jun. 17, 2021

Related U.S. Application Data

(60) Provisional application No. 62/947,715, filed on Dec. 13, 2019.

(51) Int. Cl.
*G06T 17/20*    (2006.01)
*G06T 19/20*    (2011.01)

(52) U.S. Cl.
CPC .......... *G06T 17/205* (2013.01); *G06T 19/20* (2013.01); *G06T 2210/36* (2013.01); *G06T 2219/2012* (2013.01)

(58) Field of Classification Search
CPC ... G06T 17/205; G06T 19/20; G06T 2210/36; G06T 2219/2012
See application file for complete search history.

(56) References Cited

U.S. PATENT DOCUMENTS

| 8,217,941 B2 | 7/2012 | Park et al. |
| 9,269,144 B2 | 2/2016 | Kraus et al. |
| 2009/0060121 A1 | 3/2009 | Ziegler et al. |
| 2015/0287158 A1* | 10/2015 | Cerny ............... G06T 11/40 345/553 |
| 2019/0287495 A1* | 9/2019 | Mathur ............... G06F 3/147 |
| 2020/0020154 A1* | 1/2020 | Kerckaert ........... G06T 15/06 |

OTHER PUBLICATIONS

Zhexin Xie et al., An Improved Supervoxel Clustering Algorithm of 3D Point Clouds for the Localization of Industrial Robots, MDPI electronics, May 2022, pp. 17 (Year: 2022).*
Kauker, Daniel, et al., VoxLink—Combining sparse volumetric data and geometry for efficient rendering; Computational Visual Media; vol. 2, No. 1, Mar. 2016, 45-56; 12 pgs.
International Preliminary Report on Patentability in corresponding application PCT/US2020/064468, WIPO, dated Jun. 23, 2022.

* cited by examiner

*Primary Examiner* — Phuc N Doan
(74) *Attorney, Agent, or Firm* — Procopio, Cory, Hargreaves & Savitch LLP

(57) ABSTRACT

Managing volumetric data, including: defining a view volume in a volume of space, wherein the volumetric data has multiple points in the volume of space and at least one point is in the view volume and at least one point is not in the view volume; defining a grid in the volume of space, the grid having multiple cells and dividing the volume of space into respective cells, wherein each point has a corresponding cell in the grid, and each cell in the grid has zero or more corresponding points; and reducing the number of points for a cell in the grid where that cell is outside the view volume.

14 Claims, 4 Drawing Sheets

REDUCING VOLUMETRIC DATA WHILE RETAINING VISUAL FIDELITY

CROSS-REFERENCE TO RELATED APPLICATIONS

This application claims the benefit of priority under 35 U.S.C. § 119(e) of U.S. Provisional Patent Application No. 62/947,715, filed Dec. 13, 2019, entitled "Reducing Volumetric Data While Retaining Visual Fidelity." The disclosure of the above-referenced application is incorporated herein by reference.

BACKGROUND

Field

The present disclosure relates to volumetric data, and more specifically, to reducing volumetric data while retaining visual fidelity.

Background

Volumetric data can be very large, in some instances on the order of hundreds of gigabytes of memory and billions of unique points. Loading and rendering such a huge amount of data can be very problematic for real-time performance, especially for virtual production in movies and TV, games, and virtual and augmented reality experiences.

SUMMARY

The present disclosure provides for reducing volumetric data while retaining visual fidelity.

In one implementation, a method for managing volumetric data is disclosed. The method includes: defining a view volume in a volume of space, wherein the volumetric data has multiple points in the volume of space and at least one point is in the view volume and at least one point is not in the view volume; defining a grid in the volume of space, the grid having multiple cells and dividing the volume of space into respective cells, wherein each point has a corresponding cell in the grid, and each cell in the grid has zero or more corresponding points; and reducing the number of points for a cell in the grid where that cell is outside the view volume.

In one implementation, the method further includes keeping the number of points constant for the cells that are inside the view volume. In one implementation, the view volume is a 3-dimensional (3-D) box. In one implementation, reducing the number of points for a cell includes merging and spatially filtering the volumetric data to replace a first number of points with a second number of points, wherein the first number is larger than the second number. In one implementation, each point in the second number of points uses locally-averaged position, color, and size. In one implementation, the method further includes defining two or more sub-cells for a cell in the grid, each sub-cell being within the cell.

In another implementation, a system to manage volumetric data is disclosed. The system includes: a view volume definer to define a view volume in a volume of space, wherein the volumetric data has multiple points in the volume of space and at least one point is in the view volume and at least one point is not in the view volume; a grid definer to define a grid in the volume of space, the grid having multiple cells, wherein the volume of space is divided into respective cells, each point has a corresponding cell in the grid, and each cell in the grid has zero or more corresponding points; a processor to receive the view volume from the view volume definer and the grid from the grid definer; and a point reducer to receive the view volume and the grid from the processor to reduce the number of points for a cell in the grid of the volumetric data, when the cell is outside the view volume, wherein the processor displays the point-reduced volumetric data once the point reducer finishes its operation.

In one implementation, the system is a head-mounted virtual reality (VR) set worn by a user, wherein the VR set is configured to process and display the volumetric data for viewing by the user. In one implementation, the view volume is a 3-D box. In one implementation, the system further includes mergers and spatial filters to merge and spatially filter the volumetric data to replace a first number of points with a second number of points, wherein the first number is larger than the second number. In one implementation, the mergers and spatial filters also perform local averaging of position, color, and size of each point in the second number of points. In one implementation, the system further includes a sub-cell definer to define two or more sub-cells for a cell in the grid, wherein each sub-cell is within the cell. In one implementation, the sub-cell definer defines position, color, and size of each point using a box filter in three dimensions. In one implementation, the sub-cell definer defines position, color, and size of each point using a Gaussian filter in three dimensions.

In another implementation, a non-transitory computer-readable storage medium storing a computer program to manage volumetric data is disclosed. The computer program includes executable instructions that cause a computer to: define a view volume in a volume of space, wherein the volumetric data has multiple points in the volume of space and at least one point is in the view volume and at least one point is not in the view volume; define a grid in the volume of space, the grid having multiple cells and dividing the volume of space into respective cells, wherein each point has a corresponding cell in the grid, and each cell in the grid has zero or more corresponding points; and reduce the number of points for a cell in the grid where that cell is outside the view volume.

In one implementation, the computer program further includes executable instructions that cause the computer to keep the number of points constant for the cells that are inside the view volume. In one implementation, the view volume is a 3-dimensional (3-D) box. In one implementation, the executable instructions that cause the computer to reduce the number of points for a cell includes executable instructions that cause the computer to merge and spatially filter the volumetric data to replace a first number of points with a second number of points, wherein the first number is larger than the second number. In one implementation, each point in the second number of points uses locally-averaged position, color, and size. In one implementation, the computer program further includes executable instructions that cause the computer to define two or more sub-cells for a cell in the grid, each sub-cell being within the cell.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1A:
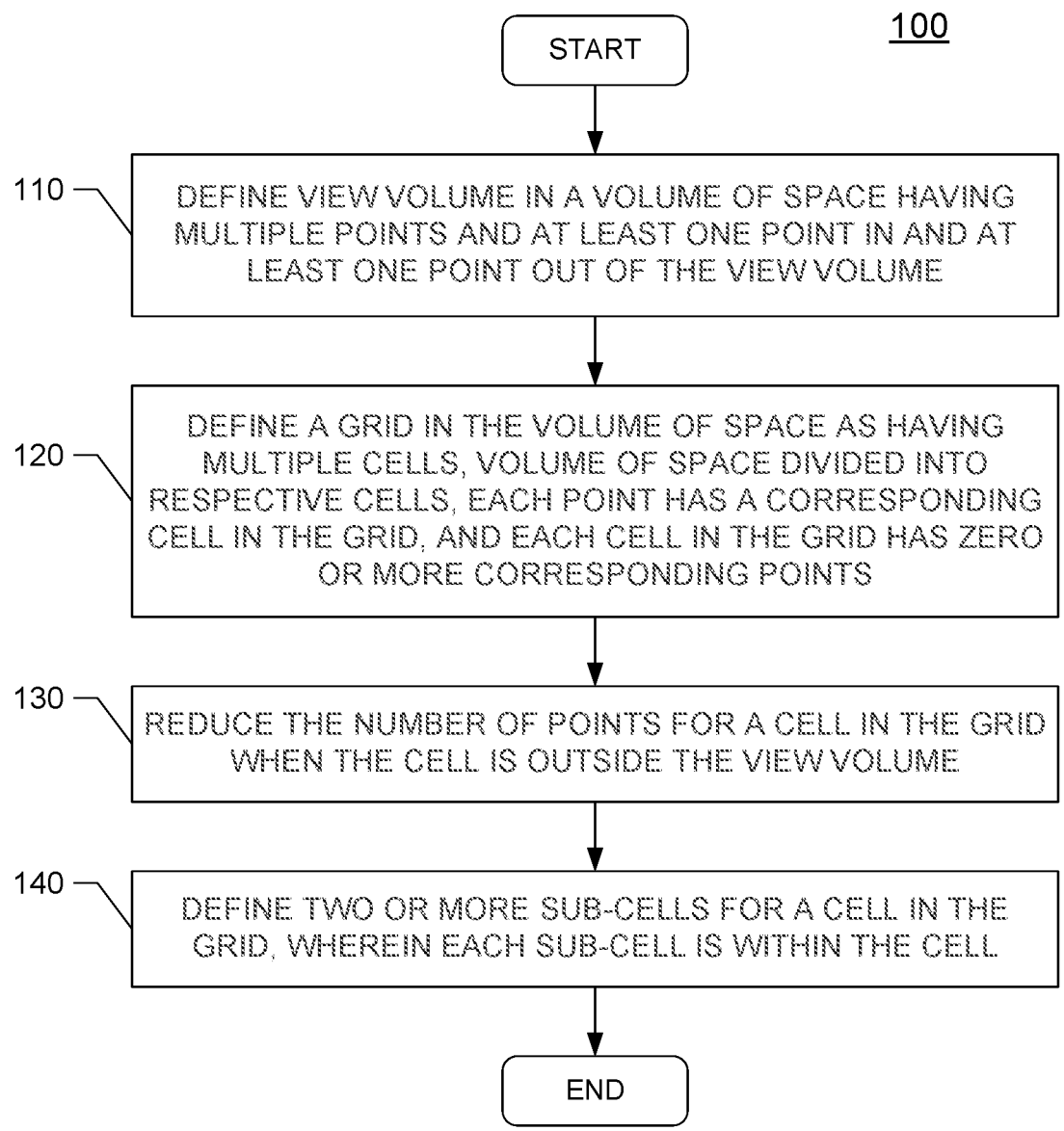
FIG. 1A is a flow diagram of a method for managing volumetric data in accordance with one implementation of the present disclosure.

As described above, volumetric data can be very large. Accordingly, loading and rendering such a huge amount of data can be very problematic for real-time performance, especially for virtual production in movies and TV, games, and virtual and augmented reality experiences.

Certain implementations of the present disclosure provide systems and methods to implement a technique for processing video data. In one implementation, a video system creates and manages volumetric data. The system specifies a limited viewing volume of the volumetric data. The system uses the limited viewing volume to reduce the overall volumetric point count of the data without loss of rendered visual fidelity/quality from any location and direction inside the interior viewing volume. This reduction allows for reduced data loading times and faster streaming of the data, as well as faster rendering (visual display) due to the processing of less number of points. These improvements in speed are useful for virtual reality (VR) applications due to the performance requirements of the head-mounted displays and for virtual production in movies and TV, games, and virtual and augmented reality experiences.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, a specific viewing volume defines the potential viewable areas of interest where visual fidelity decreases as distance increases from the interior viewing volume to any location in a volume of space (e.g., a scene in a movie or game). In this implementation, a constant level of detail can be set for all points inside the interior viewing volume using the input property 'minimum point size', while a varying level of detail can be set for locations outside (i.e., the exterior viewing volume) of the interior viewing volume by projecting the minimum interior point size, out away from the volume boundary based on the distance from the volume to an exterior location. Thus, by defining a specific volume of space that will limit where the user will be observing the data from, various methods can be employed for combining and reducing the data in a way that has minimal impact on the visual fidelity.

In one implementation, the volumetric data is merged and spatially filtered to replace many points with fewer points of a locally averaged position, color, and size. In other implementations, any property associated with a point can be filtered at any location in space.

In one implementation of a system for managing volumetric data, a specific view volume of space is specified as a 3-D box in space at any location, size and orientation from where the volumetric data is expected to be viewed. In another implementation, the specific view volume is specified as other shapes such as a hemisphere or 3-D view frustum of rectangular pyramid. There can be optional settings for both the interior and exterior data for that volume. For example, a minimum point size for the interior data and a resolution of sample grid for the exterior data.

In one implementation, a spatial data structure is used to speed up processing and to spatially subdivide a volume to collect locally adjacent points at a specific location in space. The spatial data structure can include points with properties or deeper spatial subdivisions of point locations to efficiently handle a varying amount of highly-detailed point clouds with limited memory.

For example, in a video system using a Uniform Grid as the spatial data structure, the system subdivides a large number of points into "grid cells" for fast searching. In one implementation, this is used for 3-D filtering of adjacent points. In this implementation, each 3-D point position quickly maps to a cell using a single multiply and add operation, and each cell can have a list of points or sub-grids if the cell has been subdivided. Further, to avoid large point lists in a single cell, the cell can be recursively subdivided and pre-sorted to improve performance. In one implementation, the system defines a specified grid resolution to efficiently manage a maximum number of points per cell. The system subdivides each cell based on the specified grid resolution. Thus, in one implementation, only the adjacent cells are considered for filtering. However, in other implementations, the system allows for any filter size across multiple cells and grids, such as to improve quality. The output of the filtered data is a single large list of points which is split up volumetrically by a final Uniform Grid at a lower resolution. The result of that is then used to divide the points up into a continuous level of detail (LOD) data structure for rendering.

Accordingly, in one implementation, the video system uses the following process to manage the volumetric data. For each point, following steps are taken: (1) calculate cell properties at the point such as minimum, maximum, center; (2) calculate the distance from the point to the nearest viewing volume rectangular box boundary; (3) set the sub-cell as the minimum cell size if the point is inside the box, otherwise, project the sub-cell from the boundary out at the distance resulting in a projected size; (4) load the sub-cell with data from main grid; (5) compute the list of points in each sub-cell; (6) calculate the final point color and size from the list of points in the final sub-cell using a box filter; and compute the list of points in each sub-cell.

In an alternative implementation, rather than using a Uniform Grid for sorting, any spatial data structure (e.g., KD-Tree, BST, Octree, etc.) can be used depending on the requirements for run-time performance and memory constraint. Further, using different spatial sorting systems together often provides efficiency improvement over using only a single type of sorting. For example, it is often beneficial to first sort the points using the KD-Tree as a 'coarse' sort and then use the Uniform Grid as a 'fine' sort. However, in general, the Uniform Grid runs fast since it has good CPU cache coherency for minimal CPU execution stalling in a multithreaded environment.

In the calculation of the final point size and color in a sub-cell, the system uses any filter type including a box filter or a Gaussian filter in three dimensions. Non-uniform filters like a Gaussian distribution filter kernel emphasizes local properties like position, size, and color for the final single output point properties which can improve sharpness at the cost of adding noise. The three-dimensional filter kernel is used to blend the point color and size to retain visual fidelity and look. Thus, various filtering kernels and size can be used to resolve the accurate properties of the point cloud dataset at any location in three-dimensional space, such as a 3×3×3 box, Gaussian, etc.

A further implementation includes customizable sampling rate and data filtering and settings for both the interior viewing volume and the exterior viewing volume. In this implementation, a minimum point size is set for the interior viewing volume and defines the sample rate based on the Uniform Grid resolution. The sub-voxel position is retained for each sampled sub-cell using the average position of the local cluster of points. Thus, retaining the sub-voxel position for the filtered output points in each sub-cell reduces the visual noise artifacts associated with sampling data on a uniform grid of locations. This improves the visual quality with animated datasets that have slow movements.

FIG. 1A is a flow diagram of a method 100 for managing volumetric data in accordance with one implementation of the present disclosure. In the illustrated implementation of FIG. 1A, the method includes defining a view volume in a volume of space, at step 110. Thus, in one implementation, the view volume defines a volume of space around where the player is located in a game or movie. In one implementation, the view volume is a box. In another implementation, the view volume is a hemisphere. Further, the volumetric data has multiple points in the volume of space and at least one point is in the view volume and at least one point is not in the view volume.

Figure 1B:
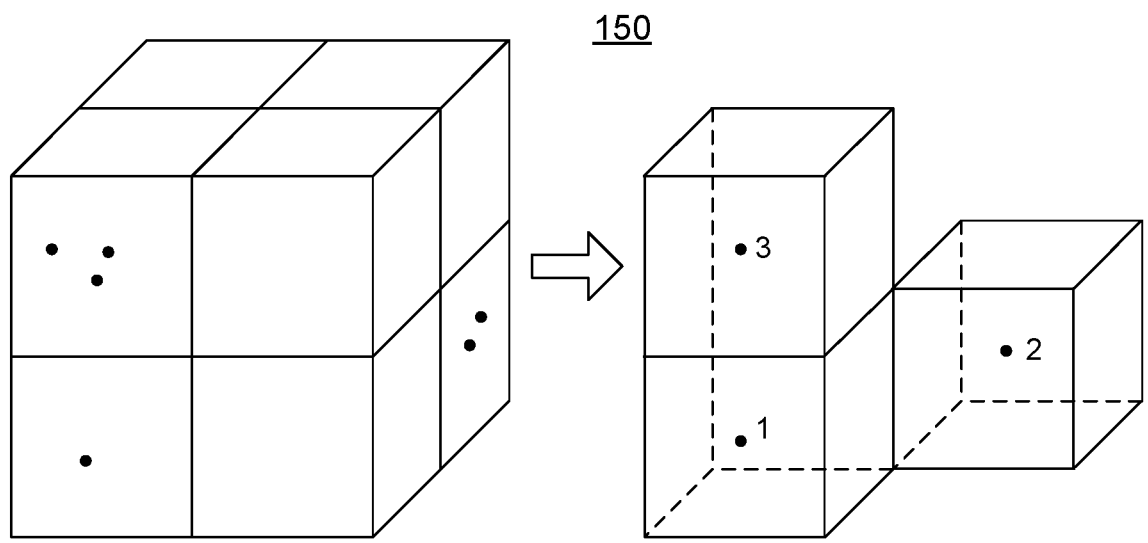
FIG. 1B is an illustration of the step of reducing the number of points for a cell in the grid.

A grid is defined in the volume of space, at step 120, as having multiple cells. The volume of space is divided into respective cells, and each point has a corresponding cell in the grid. Each cell in the grid has zero or more corresponding points. The number of points for a cell in the grid is then reduced, at step 130, when the cell is outside the view volume. Thus, in this implementation, the volumetric point count inside the view volume is kept constant, while the volumetric point count outside of the view volume is reduced. See FIG. 1B for the illustration 150 of the step of reducing the number of points for a cell in the grid.

In one implementation, the number of points for a cell is reduced by merging and spatially filtering the data to replace a first number of points with a second number of points, wherein the first number is larger than the second number. Each point in the second number of points uses locally-averaged position, color, and size. In one implementation, two or more sub-cells for a cell in the grid are defined, at step 140, wherein each sub-cell is within the cell.

As described above, in the calculation of the final point size and color in a sub-cell, the system uses any filter type including a box filter or a Gaussian filter in three dimensions. Non-uniform filters like a Gaussian distribution filter kernel emphasizes local properties like position, size, and color for the final single output point properties which can improve sharpness at the cost of adding noise. The three-dimensional filter kernel is used to blend the point color and size to retain visual fidelity and look. Thus, various filtering kernels and size can be used to resolve the accurate properties of the point cloud dataset at any location in three-dimensional space, such as a 3×3×3 box, Gaussian, etc.

Figure 2:
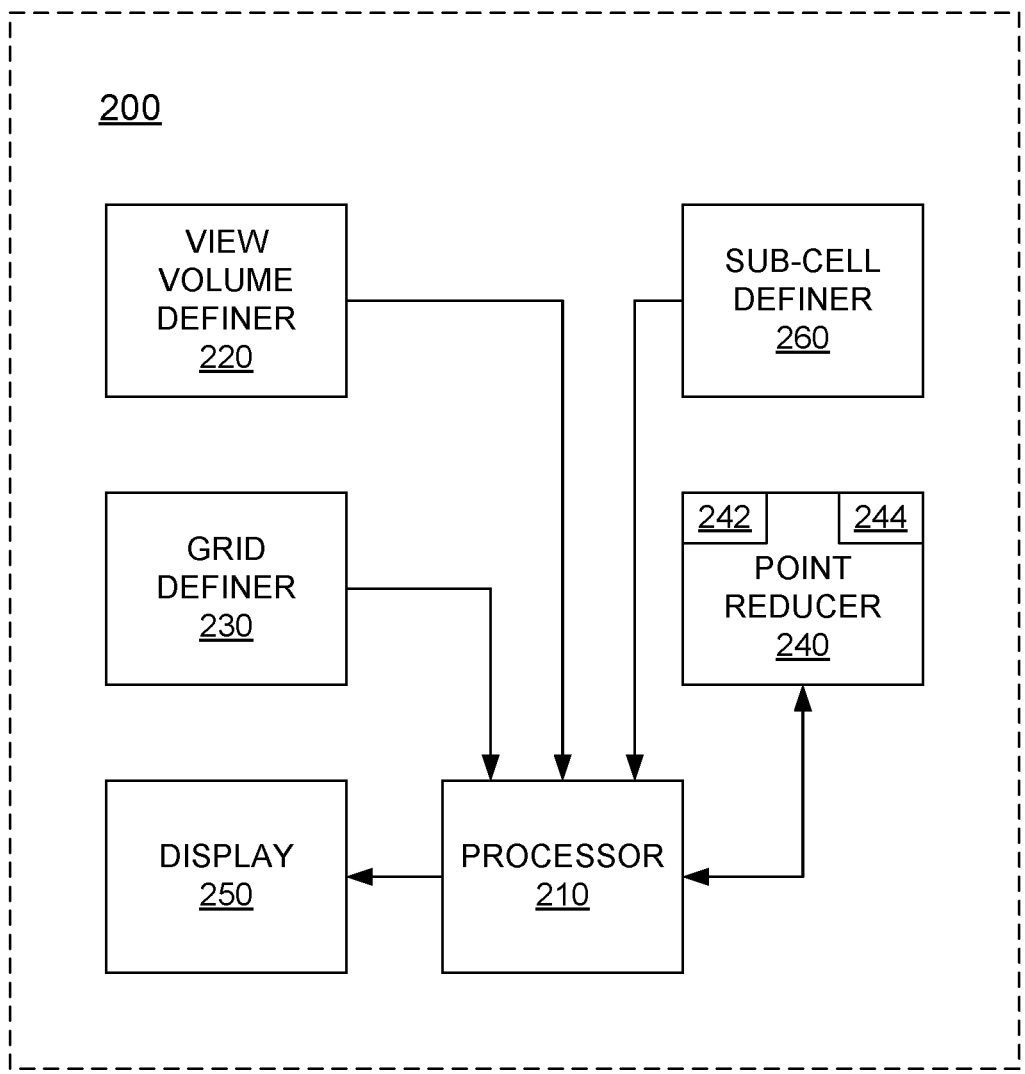
FIG. 2 is a block diagram of a system for managing volumetric data in accordance with one implementation of the present disclosure.

FIG. 2 is a block diagram of a system 200 for managing volumetric data in accordance with one implementation of the present disclosure. In one implementation, the system 200 is a head-mounted virtual reality (VR) set worn by a user, wherein the VR set is configured to process and display the volumetric data for viewing by the user. In the illustrated implementation of FIG. 2, the system 200 includes a processor 210 in communication with a view volume definer 220, a grid definer 230, a point reducer 240, a display 250, and a sub-cell definer 260. In one implementation, the sub-cell definer 260 defines two or more sub-cells for a cell in the grid, wherein each sub-cell is within the cell.

In one implementation, the view volume definer 220 is configured to define a view volume in a volume of space. The defined view volume is communicated to the processor 210. In one implementation, the view volume is a box. In another implementation, the view volume is a hemisphere. Further, the volumetric data has multiple points in the volume of space and at least one point is in the view volume and at least one point is not in the view volume.

In one implementation, the grid definer 230 is configured to define a grid in the volume of space as having multiple cells. The volume of space is divided into respective cells, and each point has a corresponding cell in the grid. Each cell in the grid has zero or more corresponding points. The defined grid is communicated to the processor 210.

In one implementation, the point reducer 240 is configured to reduce the number of points for a cell in the grid when the cell is outside the view volume. Thus, as described above, the volumetric point count inside the view volume is kept constant, while the volumetric point count outside of the view volume is reduced. Therefore, in contrast to compression, the selective "quantity reduction" of this implementation is lossy but retains the visual (including size and color) fidelity. The point reducer 240 communicates the result of the reduction of the number of points for a cell in the grid to the processor 210.

In one implementation, the point reducer 240 reduces the number of points for a cell using mergers 242 and spatial filters 244 to merge and spatially filter the data to replace a first number of points with a second number of points, wherein the first number is larger than the second number. Each point in the second number of points uses locally-averaged position, color, and size.

In one implementation, only the adjacent cells are considered for filtering. However, in other implementations, the system 200 allows for any filter size across multiple cells and grids, such as to improve quality. The output of the filtered data is a single large list of points which is split up volumetrically by a final Uniform Grid at a lower resolution. The result of that is then used to divide the points up into a continuous level of detail (LOD) data structure for rendering.

As described above, in the calculation of the final point size and color in a sub-cell, the system 200 uses any filter type including a box filter or a Gaussian filter in three dimensions. Non-uniform filters like a Gaussian distribution filter kernel emphasizes local properties like position, size, and color for the final single output point properties which can improve sharpness at the cost of adding noise. The three-dimensional filter kernel is used to blend the point color and size to retain visual fidelity and look. Thus, various filtering kernels and size can be used to resolve the accurate properties of the point cloud dataset at any location in three-dimensional space, such as a 3×3×3 box, Gaussian, etc.

Once the point reducer 240 finishes its operation, the processor 210 displays the point-reduced volumetric data on the display 250.

Figure 3A:
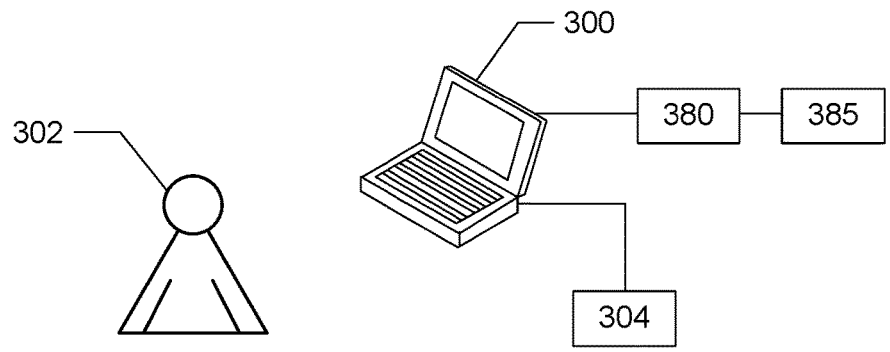
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a video application 390 for managing volumetric data as illustrated and described with respect to the method 100 and the system 200 in FIGS. 1A and 2.

Figure 3B:
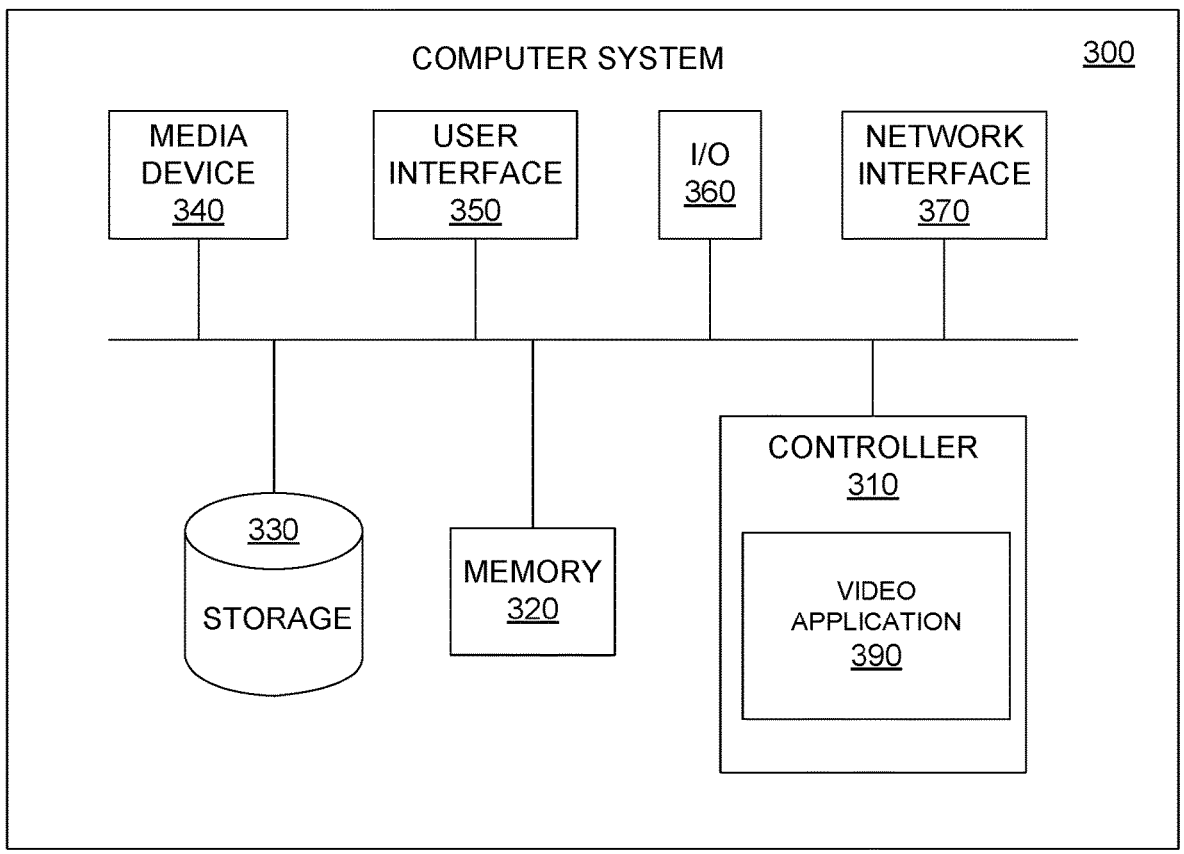
FIG. 3B is a functional block diagram illustrating the computer system hosting the video application in accordance with an implementation of the present disclosure.

The computer system 300 stores and executes the video application 390 of FIG. 3B. In addition, the computer system 300 may be in communication with a software program 304. Software program 304 may include the software code for the video application 390. Software program 304 may be loaded on an external medium such as a CD, DVD, or a storage drive, as will be explained further below.

Furthermore, the computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the video application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the video application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the video application 390 with a software system, such as to enable the creation of groups of devices and transmission of device setting data in parallel using task queues. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the video application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).]

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for managing volumetric data for a head-mounted virtual reality set, comprising:
   defining a view volume in a volume of space, wherein the volumetric data has multiple points in the volume of space and at least one point is in the view volume and at least one point is not in the view volume;
   defining a grid in the volume of space, the grid having multiple cells and dividing the volume of space into respective cells, wherein each point has a corresponding cell in the grid, and each cell in the grid has zero or more corresponding points; and
   reducing the number of points for a cell in the grid where that cell is outside the view volume by merging and spatially filtering the volumetric data to replace a first number of points with a second number of points, wherein the first number is larger than the second number,
   wherein the number of points in cells outside of the view volume is reduced proportionally to a distance from the view volume by local averaging position, color, and size of each point in the cells outside of the view volume.

2. The method of claim 1, further comprising
   keeping the number of points constant for the cells that are inside the view volume.

3. The method of claim 1, wherein the view volume is a 3-dimensional (3-D) box.

4. The method of claim 1, further comprising
   defining two or more sub-cells for a cell in the grid, each sub-cell being within the cell.

5. A system to manage volumetric data for a head-mounted virtual reality (VR) set having a VR display, the system comprising:
- a view volume definer to define a view volume in a volume of space, wherein the volumetric data has multiple points in the volume of space and at least one point is in the view volume and at least one point is not in the view volume;
- a grid definer to define a grid in the volume of space, the grid having multiple cells, wherein
- the volume of space is divided into respective cells,
- each point has a corresponding cell in the grid, and
- each cell in the grid has zero or more corresponding points;
- a processor to receive the view volume from the view volume definer and the grid from the grid definer; and
- a point reducer to receive the view volume and the grid from the processor to reduce the number of points for a cell in the grid of the volumetric data, when the cell is outside the view volume by merging and spatially filtering the volumetric data to replace a first number of points with a second number of points, wherein the first number is larger than the second number,
- wherein the number of points in cells outside of the view volume is reduced proportionally to a distance from the view volume by local averaging position, color, and size of each point in the cells outside of the view volume,
- wherein the processor displays the point-reduced volumetric data on the VR display once the point reducer finishes its operation.

6. The system of claim 5, wherein the VR set is configured to process and display the volumetric data for viewing by the user.

7. The system of claim 5, wherein the view volume is a 3-D box.

8. The system of claim 5, further comprising
- a sub-cell definer to define two or more sub-cells for a cell in the grid, wherein each sub-cell is within the cell.

9. The system of claim 8, wherein the sub-cell definer defines position, color, and size of each point using a box filter in three dimensions.

10. The system of claim 8, wherein the sub-cell definer defines position, color, and size of each point using a Gaussian filter in three dimensions.

11. A non-transitory computer-readable storage medium storing a computer program to manage volumetric data, the computer program comprising executable instructions that cause a computer to:
- define a view volume in a volume of space, wherein the volumetric data has multiple points in the volume of space and at least one point is in the view volume and at least one point is not in the view volume;
- define a grid in the volume of space, the grid having multiple cells and dividing the volume of space into respective cells, wherein each point has a corresponding cell in the grid, and each cell in the grid has zero or more corresponding points; and
- reduce the number of points for a cell in the grid where that cell is outside the view volume by merging and spatially filtering the volumetric data to replace a first number of points with a second number of points, wherein the first number is larger than the second number,
- wherein the number of points in cells outside of the view volume is reduced proportionally to a distance from the view volume by local averaging position, color, and size of each point in the cells outside of the view volume.

12. The non-transitory computer-readable storage medium of claim 11, further comprising executable instructions that cause the computer to keep the number of points constant for the cells that are inside the view volume.

13. The non-transitory computer-readable storage medium of claim 11, wherein the view volume is a 3-dimensional (3-D) box.

14. The non-transitory computer-readable storage medium of claim 11, further comprising executable instructions that cause the computer to
- define two or more sub-cells for a cell in the grid, each sub-cell being within the cell.

* * * * *